United States Patent [19]

Lof

[11] 4,141,338
[45] Feb. 27, 1979

[54] SOLAR HEAT ABSORBER

[76] Inventor: George O. G. Lof, 3367 S. Willow Ct., Denver, Colo. 80231

[21] Appl. No.: 605,671

[22] Filed: Aug. 18, 1975

[51] Int. Cl.² ............................................. F24J 3/02
[52] U.S. Cl. ..................................... 126/270; 165/170
[58] Field of Search ............... 126/270, 271; 237/1 A; 165/152, 170

[56] References Cited

U.S. PATENT DOCUMENTS

| 1,015,404 | 1/1912 | Schewczik | 165/170 |
| 1,397,325 | 11/1921 | Murray | 165/170 |
| 1,814,897 | 7/1931 | Coxe | 126/270 |
| 2,349,965 | 5/1944 | Hurley | 165/170 |
| 2,601,905 | 7/1952 | Anderegg | 126/270 |
| 3,102,532 | 9/1963 | Shoemaker | 126/270 |
| 3,145,707 | 8/1964 | Thomason | 126/271 |
| 3,863,621 | 2/1975 | Schoenfelder | 126/270 |
| 3,916,871 | 11/1975 | Estes et al. | 126/271 |
| 3,939,818 | 2/1976 | Hamilton et al. | 126/271 |
| 3,957,109 | 5/1976 | Worthington | 126/270 |

FOREIGN PATENT DOCUMENTS

| 276788 | 7/1967 | Australia | 126/270 |
| 1097233 | 2/1955 | France | 126/271 |

Primary Examiner—Kenneth W. Sprague

[57] ABSTRACT

A relatively thin solar heat collector, for solar heat collecting units, having a series of discontinuities in its surface in the form of projections, increasing surface area for absorption and heat transfer.

3 Claims, 8 Drawing Figures

U.S. Patent  Feb. 27, 1979  4,141,338
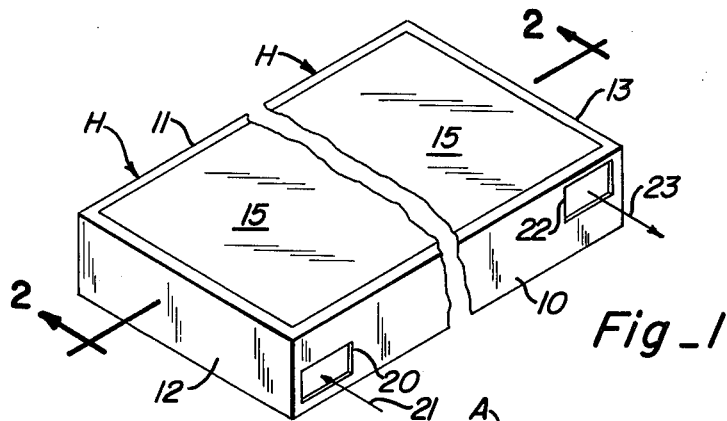
Fig_1
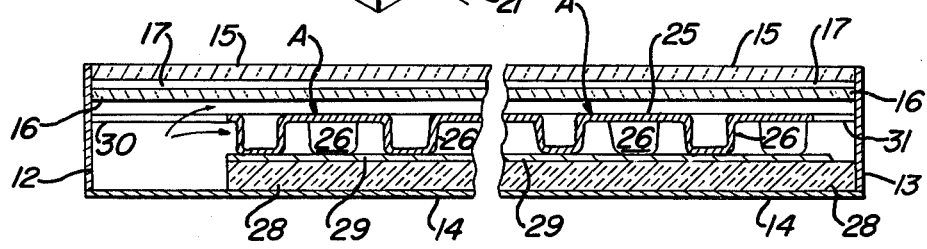
Fig_2
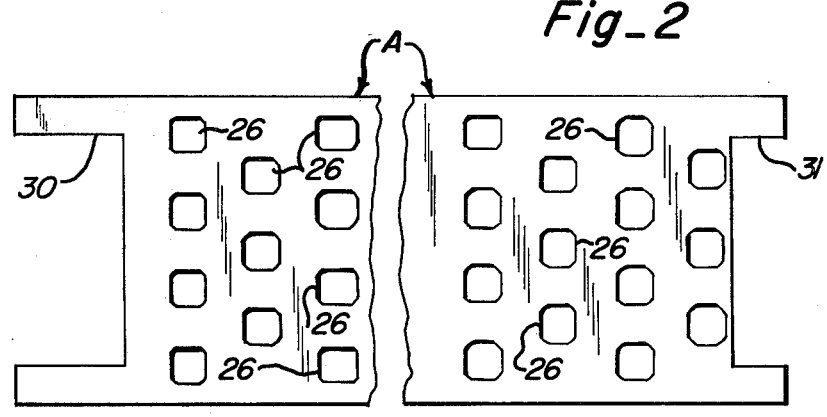
Fig_3
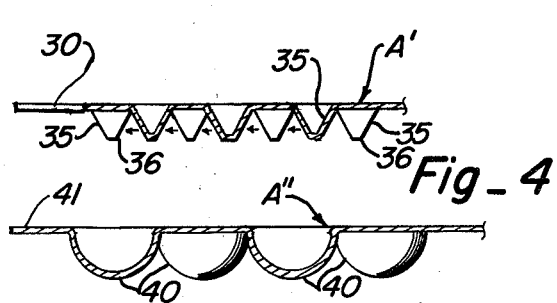
Fig_4
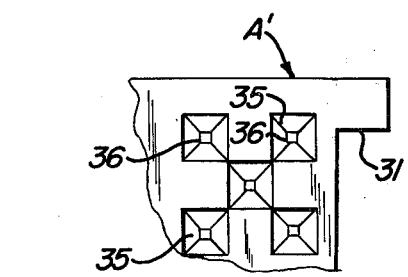
Fig_5
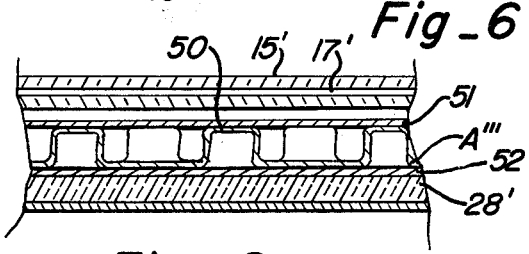
Fig_6
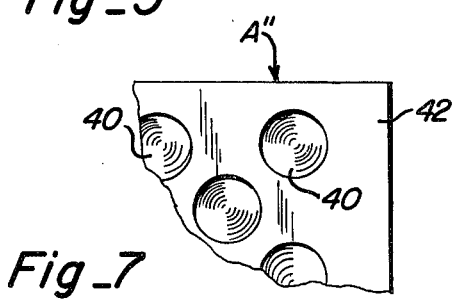
Fig_7
Fig_8

SOLAR HEAT ABSORBER

This invention relates to absorbers for solar radiation arranged to heat an air heat transfer medium, being related to my copending application Ser. No. 553,471, filed Feb. 27, 1975, for "Modular Construction for Solar Heat Collector" and the copending application of Lilburn E. Shaw, Ser. No. 553,472, filed Feb. 27, 1975, for "Solar Heat Absorber for Fluid Transfer Systems".

Many conventional solar heaters utilize a liquid or a gaseous heat transfer medium to transfer heat from a solar radiation absorber to a space to be heated or a heat storage unit. Gaseous systems have many advantages, as air is usually the transfer medium. Air is economical to move through inexpensive conveying duct work and is moved by relatively inexpensive blowers. Furthermore, it does not freeze and is inexpensive to replace. The overall air system is not required to be completely leakproof, such as is required of liquid systems, while the materials of construction are most likely to be less expensive than those utilized in liquid systems and generally have a longer life.

A solar heater, using a fluid heat transfer medium requires a collector for solar radiation and a transfer medium, such as air, to transfer the absorbed heat to use or a storage area. The collector is usually a closed housing having a cover which is transparent to solar radiation, and within the housing is a solar radiation absorber, usually a dull, black heat collector plate. The transfer medium is moved in a heat transfer relation with the absorber, either below or above the plate, or both, to pick up the heat absorbed and is then conveyed to use or a storage area. A number of housings may be placed side by side, receiving cool air from a common manifold and discharging heated air into a common manifold, or a portion of each housing, at opposite ends, may be utilized for the same purpose. In the usual installation, the heat absorbing assembly is mounted on the roof of a structure, such as a house, building or the like, and is mounted at a slope, so as to provide as large an absorption area as possible, and preferably normal to the angle of solar radiation. As a mechanism to maintain the surface at exactly right angles to the solar radiation during all day and at all seasons is extremely expensive, such units are normally mounted at a slope which is a compromise between the high and low points of the sun at mid-day of the various seasons.

Among the objects of the present invention is to provide an improved solar heat absorber utilizing air as the transfer medium.

Another object of the invention is to provide an improved solar heat absorber which provides an increased surface area for heating the air passing in contact therewith.

Another object of the invention is to provide an improved solar heat absorber which provides increased turbulence in the air passing in contact therewith.

Still another object of the invention is to provide an improved solar heat absorber having a series of discontinuities in a surface which is generally parallel to the cover or glass.

Another object of the invention is to provide an improved solar absorbing unit which is arranged for effective and efficient heat absorption from solar radiation and transfer of the absorbed heat through a transfer medium, such as air.

Another object of this invention is to provide a solar heat absorber by which heat loss is reduced through a greater area of surface to be contacted by the heat transfer medium, such as air and greater turbulence in the air stream.

Another advantage in the configuration of the absorber is the effect of the depressions or discontinuities in the surface which increases the absorptivity of the absorber for solar radiation. Each cavity or depression acts as a trap for solar radiation by providing surfaces which will increase the probability of a solar ray being absorbed. Rays reflected from an imperfectly absorbing wall or surface of a cavity can impinge on and be absorbed by a second wall or surface of the cavity, thereby increasing the total effective solar absorptivity.

According to the present invention, an effective and efficient heat absorber for solar heating systems using a fluid heat transfer medium is a plate or the like, preferably painted black, and having a series of discontinuities on its surface. The plane surface of the heat absorber plate is preferably disposed parallel to the heat transparent cover of the housing, with the discontinuities preferably facing away from the cover. The discontinuities may be in the form of generally rectangular projections having rounded corners, conical or pyramidal projections having blunted ends, or hemispherical projections. The projections are conveniently placed in rows, with the projections of one row staggered with respect to the projections in an adjacent row, to simplify manufacture, to increase air turbulence, and to increase the contact area of the fluid heat transfer medium, such as air. The heat rays which pass through the heat transparent cover not only heat the surface of the heat absorber, but also the interior of the projections, so that a much greater surface area is provided for transfer of heat to the air moving below the plate. Due to the angled repose of the housing, the sun's rays will not only pass through the cover to impinge on the plate, but many of the sun's rays will also impinge upon the lateral walls of the discontinuities.

The foregoing and other objects and advantages of the invention will become apparent by the following description, taken in connection with the accompanying drawings, in which:

FIG. 1 is a condensed perspective view of a solar radiation, heat absorbing unit constructed in accordance with the present invention.

FIG. 2 is a condensed longitudinal section, on an enlarged scale and taken along line 2—2 of FIG. 1.

FIG. 3 is a condensed top plan view of a heat absorber plate utilized in the unit and shown in FIG. 2.

FIG. 4 is a fragmentary longitudinal section similar to a portion of FIG. 2, showing a modified form of heat absorber plate also constructed in accordance with this invention.

FIG. 5 is a fragmentary top plan view of the heat absorber plate of FIG. 4.

FIG. 6 is a fragmentary section similar to FIG. 4, showing another modified form of heat absorber plate also constructed in accordance with this invention.

FIG. 7 is a fragmentary top plan view of a portion of the heat absorber plate of FIG. 6.

FIG. 8 is a fragmentary side elevational section of a modified heat absorber according to the invention.

In the heat absorber illustrated in FIGS. 1–3, the housing H includes parallel side walls 10 and 11, parallel end walls 12 and 13 and a bottom wall 14. The top of the housing H is closed by a top cover 15, which may be glass, plastic or the like, for the passage of solar radiation and the absorption of thermal energy within the housing. This is the so-called "greenhouse" effect. Normally, an inner cover 16, which likewise may be glass, plastic or the like and transparent to the major components of solar radiation impinging thereon, provides a generally closed air space 17, between the outer cover 15 and inner cover 16, which provides an insulating effect but across which the solar radiation may readily pass. Top cover 15 and inner cover 16 may be supported in any suitable manner, as by longitudinal slots in the side walls, as in my aforesaid copending application Ser. No. 553,471.

Air to be heated may be passed through an inlet 20 in the direction of an arrow 21, while the heated air may be discharged through an outlet 22 in the direction of an arrow 23. Disposed beneath the inner cover 16 and spaced therefrom is a heat absorber A formed from a plate or the like, to provide a surface 25 which is generally parallel to the inner cover 16, with a series of depending discontinuities 26, such as generally rectangular in shape but with rounded corners and extending downwardly or in the opposite direction from the inner cover 16. Air from the inlet flows past the extended members in its passage to the outlet. The discontinuities 26 are so placed as to increase the turbulence of air impinging against them, as by placing the discontinuities in several rows with those of one row interspaced with those of adjacent rows, although the pattern may be varied widely, as desired. The increased turbulence increases heat exchange from the absorber to the air.

A block 28 of insulation, resting on bottom 14 and extending between the sidewalls 10 and 11, reduces the loss of heat by conduction or radiation from the bottom of the heat absorber A. The insulation may be of any suitable type, such as a rigid plastic foam or a fibrous glass mat. A blackened metal plate 29 may be interposed between absorber plate A and insulation 28 in order to provide additional heat transfer surface for heating air flowing in contact therewith, heat being radiated from the lower surface of absorber plate A to the upper surface of plate 29, absorbed thereon and transferred to the flowing air by convection and connection. A further function of plate 29 is to receive heat by conduction from absorber plate A through direct contact between the plate 29 and the bases of the depressions or discontinuities 26, thereby providing additional heat supply to plate 29 for transfer to air flowing in contact therewith. The air to be heated is, in any event, directed beneath the heat absorber to contact the discontinuities, but may also be directed between the heat absorber and the inner cover.

The heat absorber A may be formed of metal, such as thin aluminum or the like coated with a dull, black paint or a thin selective radiation coating for absorption of solar radiation. The lower surface of heat absorber A may also be provided with a black thermally absorbing surface which can function as a good heat radiator to plate 29. The discontinuities 26 may be formed in any suitable manner, as in a punch press, and provide heat transfer to the air stream by convection and connection. The plate 29 preferably has a thermally absorbing surface. The heat absorber A may be provided with a rectangular slot 30 positioned at the outlet 22, so that, again, air may readily flow from both above and below the plate into the outlet.

A series of housings H may be connected together in laterally abutting relation, so that cool or unheated air may flow through each inlet opening 20, with part following the arrows of FIG. 2 and the remainder flowing across the inside of the housing and through a corresponding but opposite opening in wall 11 which feeds into the inlet opening of the next housing. Suitable air directing baffles may be placed in the inlet portions of the respective housings in order to produce equalized flow through the respective housings. In this way, a series of housings may be fed with unheated air without requiring the handling or use of unduly wide sheets of glass and the like. Thus, each housing H may be on the order of 8 feet in length and 2 feet in width.

The heated air which flows through outlet 22, may, in an assembly of laterally abutting housings, flow through a corresponding but opposite opening in the next adjacent housing, each, in turn, to mingle with the heated air produced by other heat absorbers and flow on through the tops of the housings to include additional heated air until discharged. It will be understood, of course, that separate manifolds may be used to transfer unheated air to the housings and to transfer heated air away from the housings. The heated air is led in a conventional manner to the point of use, such as areas to be heated or to a conventional heat storage system.

The heat absorber A', illustrated fragmentarily in FIGS. 4 and 5, includes interspaced discontinuities 35 which are inverted pyramidal in form and provided with flat bottoms 36 which minimize the possibility of shearing through the plate by a pointed punch when forming the inverted pyramids. Also, the flat bottoms 26 obviate the difficulty in forming an inverted short point at each pyramid of the cooperating female die. As shown, the corners of the pyramids 35 and the intersection of the corners with the flat bottom 36 are angular, but it will be understood that the corners normally will, in any event, be somewhat rounded and possibly rounded to correspond to the rounded corners of the discontinuities 26 of FIG. 2, as shown. As will be evident, the discontinuities 35 may be conical, again with flat bottoms. Also, the pyramidal discontinuities 35 may be placed closer together, as in FIG. 5, than the discontinuities 26, to insure that the air stream will be required to follow an essentially tortuous path when moving from the inlet to the outlet. The heat absorber A' of FIGS. 4 and 5 may be substituted for the heat absorber A in the heat absorbing unit, so that a portion of the air may flow over the top of the heat absorber and another portion of the air may flow against and between the depending discontinuities 35. Thus, a rectangular inlet slot 30 may be produced in the heat absorber A', as indicated, while the opposite end of the heat absorber may be provided with an outlet slot 31.

The laternative heat absorber A" illustrated fragmentarily in FIGS. 6 and 7 may be formed with discontinuities 40 which are generally hemispherical in shape, although limited to a finite thickness of the surface of the hemisphere. The corners between the plate and the discontinuities 40 may be rounded, as shown, to facilitate manufacture. Heat absorber A" may be substituted for the heat absorber A of FIG. 2, with the difference that air moves only beneath the heat absorber A", since the inlet end 41 and the outlet end 42 thereof are imperforate.

In the modification of FIG. 8, a solar heater with an upper glazing 15' is mounted in a housing (not shown) similar to the housing H of FIG. 1. Insulation 28' is mounted in the housing, in a similar manner, and it supports a metal sheet A''', which may have discontinuities 50 in any of the shapes above mentioned, or any other shape for impinging the air and producing turbulence of the flow. The lower glazing 17' may be supported by the absorber 51 or may be supported by the housing, not shown. The metal sheet A''' may be secured, as by cementing, to the absorber 51. The projecting discontinuities of the metal sheet A''' may contact the absorber plate 51 which has a blackened surface and provides an absorber with a planar upper surface, reducing the catching of dust, etc. which might occur in the depressions of the absorber of FIG. 2. The discontinuities may be formed in a metal sheet, and this sheet is secured to metal plate 52 mounted on the insulation. In some instances the metal plate 52 may be absent. When the discontinuities are formed in a sheet and secured by bonding to the absorber and the lower metal plate, a strong structural member is formed while retaining its good air flow characteristics as well as good heat transfer characteristics.

In any of the forms, the discontinuities may span the full height of the space for the air flow, thereby contacting a lower plate (on the insulation) and provide an additional heat flow path through the lower plate into the air. This, also, serves as a spacer for the construction providing structural convenience and rigidity between the two metal surfaces on each side, one upper plate and a lower plate on the insulation. The ends of the discontinuities and the plate containing them may be bonded partially or wholly to either or both upper and lower plates, by cementing, welding, etc. to enhance the heat transfer and structural strength of the unit.

Although several preferred embodiments of this invention have been illustrated and described, it will be understood that other embodiments may exist and that various changes may be made, all without departing from the spirit and scope of this invention.

What is claimed is:

1. In a solar heat collector including a housing having a solar radiation transparent cover with cool air inlet means at one end and heated air outlet means at the opposite end, the improvement comprising:
    a heat absorbing member comprising a sheet of thin metal formed with a surface generally parallel to and disposed in spaced relation to said transparent cover and arranged for the passage of air at least under said sheet,
    a series of discontinuities comprising generally rectangular projections formed by depressing said metal facing away from the cover, and
    a metal planar member disposed below said heat absorbing member with said heat absorbing member mounted by said discontinuities in heat transferring relation with said planar member and with an air passage formed between the heat absorber member and planar member.

2. In a solar heat collector as defined in claim 1, wherein:
    said discontinuities comprise projections disposed in spaced lateral rows, the projections of one row being interspaced with the projections of adjacent rows.

3. In a solar heat collector as defined in claim 1, including:
    a housing having sides, ends and a bottom, said transparent cover forming the top thereof; and
    insulation disposed between said heat absorbing radiating member and the bottom of said housing.

* * * * *